United States Patent [19]
Gerow et al.

[11] 3,802,910
[45] Apr. 9, 1974

[54] RECOVERY OF MERCURY FROM MERCUROUS BEARING LIQUIDS

[75] Inventors: Raymond F. Gerow, Berkeley Hts.; Stanley B. Soule, Springfield, both of N.J.

[73] Assignee: GAF Corporation, New York, N.Y.

[22] Filed: Apr. 12, 1972

[21] Appl. No.: 243,478

[52] U.S. Cl. ......... 117/100 M, 117/50, 117/130 E, 117/160 R
[51] Int. Cl. ............................................. C23c 3/02
[58] Field of Search ............ 117/160 R, 160 A, 228, 117/26, 105, 107, 118, 50, 131, 130 E; 210/59; 209/48, 158; 75/169

[56] References Cited
UNITED STATES PATENTS

| | | | |
|---|---|---|---|
| 2,150,929 | 3/1939 | Kohler | 117/50 |
| 2,547,536 | 4/1951 | Pollard | 117/50 |
| R25,454 | 10/1963 | Novak | 117/107 |
| 3,031,331 | 4/1962 | Aves et al. | 117/105 |
| 1,548,515 | 8/1925 | Dudzeele | 117/131 |

*Primary Examiner*—Ralph S. Kendall
*Assistant Examiner*—Jerome Massie
*Attorney, Agent, or Firm*—Walter C. Kehm; Samson B. Leavitt

[57] ABSTRACT

A composition comprising a reductor metal coated on an inert substrate and capable of forming an amalgam with mercury contained in a mercury bearing liquid in contact with said composition and a process for using said composition.

15 Claims, No Drawings

RECOVERY OF MERCURY FROM MERCUROUS BEARING LIQUIDS

BACKGROUND OF THE INVENTION

This invention relates to the recovery of mercury from mercury bearing water. It is especially concerned with the recovery of mercury from the aqueous brine effluent of a chlorine-producing cell employing a mercury cathode, the former usually referred to as a mercury-chlorine cell.

As is known, the presence of mercury in surface waters and underground wells poses a major water pollution and health problem, even small amounts of mercury are known to be quite toxic. The discharge of mercury containing effluent into surface waters and the subsequent run-off of these waters into lakes, streams and estuaries, will, in time, establish a mercury concentration high enough to cause mercury contamination of plants, aquatic life, and eventually man.

It has recently become widely known that many industrial plants are polluting our waterways, for example, by releasing mercury thereinto, which finds its way into the food supply. The methylation of inorganic mercury is undoubtedly responsible for the high levels of mercury per ounce in fish. The methylated inorganic mercury is capable of concentration in a biological system and hence the great danger. The mercury itself or inorganic mercury is biologically converted to dimethyl mercury which is the form predominantly found in the fish. We now know that inorganic mercury can be alkylated to methyl mercury in natural systems, and this points up the present dimensions of the mercury pollution problem. Broken thermometers, plastics coated with paints made with mercury catalysts, aqueous brine effluent from chlor-alkali plants, paints (in which mercury is included to protect against mildew), papermaking (where phenyl mercury compounds are used as slimasides) and the combustion of coal oil, all are found to be releasing mercury, one way or another, to the environment; eventually the mercury can find its way to water and easily be methylated. It is this released mercury which accumulates in the food chain and is transferred to man.

Various procedures for the removal of mercury from water effluent have been suggested. However, all of these are undesirable either by reason of cost or because their benefits are offset by the increase in amount of other harmful chemicals they place in the water effluent.

Some of the relatively expensive equipment now being used, or proposed, utilizes the known capabilities of certain substances to absorb the harmful colloidal and/or dissolved substances in liquid waste water effluent. For example, activated carbon has been used for removing some of these substances from effluent in conjunction with expensive and inefficiently operating equipment. In accordance therewith, a slurry of active carbon is introduced into effluent and mixed, and then the effluent is passed into a large, low velocity sediment tank. The activated carbon settles out and the effluent is removed and thereafter filtered. This, of course, requires substantial capital and equipment; periodic maintenance of the sediment tank, and a special flow rate of reaction relative to the activated carbon.

A variation of this technique is to mix activated carbon into the effluent and allow it to settle immediately; this process, however, does not provide sufficient time to use all of the activated carbon.

It has also been suggested to use columns, including packed activated carbon. In these installations, the surface area of the carbon is substantially decreased and the maintenance of the carbon columns becomes extremely expensive since the complete column has to be removed and reactivated periodically. For these reasons, the successful use of activated carbon in removing colloidal and/or dissolved substances from liquid waste effluent has not been widely used.

In the operation of electrolytic cells of the mercury cathode type for the production of chlorine and caustic soda, a small percent of the metallic mercury of the cathode is normally dissolved in the brine and lost. Since the production of chlorine in any appreciable volume employs a mercury cathode type cell, even a small amount of mercury dissolved in the brine and lost per unit of product made, constitutes an appreciable economic loss and a formidable health problem.

Attempts have been made to provide a method which is useful for the recovery of mercury from the effluent brine of mercury chlorine cells. Among such attempts are methods wherein (1) the effluent brine is subjected to the action of a soluble sulfide of an alkali metal or hydrogen thereby producing mercury sulfide from which the mercury is thereafter removed; (2) subjecting the effluent brine to the action of iron pieces or turnings, wherein the iron replaces mercury of the compound in solution in the brine and the mercury is thereby rendered recoverable as metallic mercury; and (3) subjecting the effluent brine to the action of formaldehyde which reduces the mercury ions therein to metallic mercury.

These known methods of recovering the mercury from such brines have not, however, been wholly satisfactory; the sulfides of mercury formed when the sulfide method is employed are colloidal and thus there is difficulty in getting them to settle or coalesce; iron and other multivalent compounds, e.g., vanadium, are found in brine, iron or its alloys are also present. The brine thereby is contaminated with such compounds which are harmful to effluent mercury-chlorine cell operation; the mercury formed by the reduction of mercury compounds in brines by the use of formaldehyde presents a similar problem to that faced where the sulfide method is employed, viz., production of the mercury in a highly sub-divided state with accompanying problems of coalesence.

SUMMARY OF THE INVENTION

It is an object of the instant invention to avoid one or more drawbacks of the prior art.

It is another object of the instant invention to provide for a process and composition for the removal of mercury from mercury-bearing waste water.

It is still another object of the invention to provide for the removal of mercury in a relatively inexpensive manner without, however, discharging further pollutants into the water.

It is yet a further object of the invention to remove mercury on a large scale from the effluent of a chlor-alkali plant.

While the novel features of the present invention are particularly applicable to the treatment of waste water from a chlorine-caustic facility, it is to be understood that the invention may also be used in the treatment of water effluent from most industrial operations releasing mercury-containing impurities. Such water may be released from chemical plants, manufacturing plants, industrial sewage treatment facilities, etc. Furthermore, while the present invention has particular application in treating waste water prior to final discharge, it is to be understood that the novel composition and process of the present invention serves to improve waste water so that, in some cases, it may be reused within the process discharging same. In still other applications, the present invention may be used to treat contaminated sub-surface water or water from other sources which contain mercury or mercury impurities, though not necessarily being waste water.

In the operation of electrolytic cells of the mercury cathode type for the production of chlorine and caustic soda, of a large plant represents in total a surprisingly large monetary loss per day as well as a formidable health problem. A satisfactory method of recovering the mercury so lost has not been commercially available.

This process is based in part on the discovery that by bringing an aqueous effluent having a pH between about 2 and 11 and containing from about 1 to 500 ppm of dissolved or metallic mercury into intimate contact in a reaction zone with a substantially water-stable solid metallic reducing agent, having a greater solution potential than mercury, elemental metallic mercury is removed therefrom. The liberated mercury amalgamates on the surfaces of the reducing agent and also coalesces into droplets on these surfaces. Impure mercury so recovered may be, if desired, purified by standard methods, such as acid washing or retorting, or by a combination of methods. If desired, mercury may be recovered by removing the reducing agent from the reaction zone periodically, along with accumulated reaction products, and retorting the entire mass.

Broadly speaking, the invention includes the provisions of a composition comprising a reductor metal coated on an inert substrate and capable of forming an amalgam with mercury contained in a mercury-bearing liquid in contact with said composition and a process for using said composition.

In carrying out the process, the pH of the aqueous effluent containing the mercury is adjusted, if necessary and possible, to a pH value in the range of 2 to 11 but preferably to a pH in the 3 to 5 range and more preferably to narrower pH ranges best suited to the use of the particular individual reductor metal employed. The pH of the effluent has little primary effect, within the range of about 5 to 11, on the inherent maximum attainable percent of removal of mercury therefrom. The pH has a salutory effect on the amount of reductor metal consumed by reaction with the effluent as well as on the reaction rate of mercury ions competing with hydrogen ions in reaction with the reductor metal.

DETAILED DESCRIPTION

The aqueous effluent properly adjusted as to pH, is passed through support means including a bed or substrate having thereon a reductor metal. The support means may be a suitable reactor or column. As reductor metals, those readily reducing or liberating mercury either from solution or effluent as metallic mercury include iron, zinc, bismuth, tin, nickel, magnesium, manganese and copper. Of these, iron, zinc and copper are preferred because of the lower cost of the metals as well as generally lower effluent losses and higher reaction rates when used in the process. Iron may be used for those effluents advantageously treated at a moderate pH, for example, to avoid or minimize precipitation of solids, such as oxides and hydroxides at higher pH values. Optimum mercury removal per pound of iron consumed is obtained upon adjusting the pH of the solution to a value between 6.0 and 7.5.

At pH values below 6, solution losses of iron become increasingly larger, and below a pH of 5 hydrogen evolution reduces the effective surface area of the metal and the aforementioned competition of hydrogen ions with mercury ions becomes significant. Zinc metal may be used for those effluents that are advantageously treated at a higher pH. Zinc is best used with solutions brought to a pH between 9 and 11. Although zinc readily liberates mercury in less alkaline or in acidic mediums, zinc losses become increasingly larger at lower pH values. Zinc amalgams such as are produced by the liberation of mercury at the surface of zinc metal are physically more stable than iron amalgams similarly produced.

On the other hand, iron has the advantages of having a slightly higher reaction rate and of being a less expensive metal than zinc.

The liberation of mercury from the brine is not substantially affected by the amalgamation of the surfaces of the reductor metal. The liberation of mercury continues at the amalgamated surfaces; and the free mercury not readily forming additional amalgam coalesces and may drip down through the reactor bed if the flow rate is not sufficiently great to carry the droplets away. Spent brine as it issues from mercury-chlorine cells is saturated with chlorine and generally contains in the order of 1 to 40 ppm of dissolved mercury and about 265 – 285 grams per liter of sodium chloride. It may contain small concentrations of other alkali and alkaline earth metal salts plus varying amounts of solids such as fine particulate graphite eroded from the cell electrodes.

As is readily apparent, the present invention provides for a composition and process for mercury removal which process can be carried out economically on a large scale in almost any water bearing run-off, and which does not have any appreciable effect on the pH of the water, nor does it increase the hardness thereof. It is recommended that the substrate onto which said metal is applied have a diameter varying between 1/2 and 1 ½ inches, and be an irregular shaped body. In some instances, it is recommended that the coated substrate be part of a suitable support means such as a bed, column or container which is at least 8 inches in length, and about 4 inches wide. The thickness of the metal coating should be from about 3 to about 5 mils. Greater efficiency is obtained by having longer and/or wider columns or beds where employed. It is recommended that where a single column is employed, it be at least about 12 to 24 inches long.

If it is desired to remove more mercury than will be removed by one pass over a single coated substrate, a number of passes over the same substrate or more conveniently, successive passes over a series of same are recommended whereby the liquid from one substrate is further cascaded over a second, third, and if desired, additional substrates, supported or unsupported. It is to be understood that the liquid can pass through the hollow of a cylinder, wherein the internal walls thereof are comprised of the coated substrate or over a suitable support holding the coated substrate.

It should be borne in mind that spent brine from mercury chlorine cells usually will contain anywhere from one to 500 parts of mercury per 1 million parts of spent brine. The effluent flow through or over the metal coated substrate column or bed should accordingly be between about 10 to 80 gallons per minute per square foot of cross-section of the bed. The preferred flow rate is between 20 and 60 gallons per minute per square foot of said cross-section. It is, however, a variable which is a function of bed size. Higher flow rates beyond design may decrease the efficiency of the mercury removal. The temperature of the effluent is not critical and may be anywhere between 0° and 70°C; preferably 15° to 30°C, ideally 15° to 20°C. However, the lower temperatures within this range are preferred to lessen metal deterioration. For practical purposes, the temperature is usually the temperature of the mercury bearing water effluent.

The water suitably adjusted as to pH, is passed over the coated substrate, where solids as well as oxides, carbonates, hydroxides, etc., are found to have a tendency to settle out on the metal unless a sufficiently high flow rate is employed. Deposition of solids on the reductor/metal causes a considerable decrease in the effective surface area of the reductor metal exposed to the brine; it is necessary to periodically flush these solids away therefrom.

Flushing may be accomplished by stopping the flow of water and passing over the substrate, for a time, either a countercurrent or a rapid cocurrent flow of water, the mercury solution being treated, or dilute acid solution. Mercury, amalgam, and solids flushed from the substrate may be filtered off or carried in suspension to settling tanks and there allowed to settle out as a sludge for further processing.

The frequency with which the substrate should be flushed is mostly dependent upon the amount of solids carried thereto by the liquid. Removal of particulate matter as by filtration, before passing the liquid or brine to the substrate makes fewer flushings necessary but does not entirely eliminate the need for flushing. For example, in the use of iron as the reductor metal, graphite is gradually released from the metal itself and iron oxides and hydroxides are formed, all of which may slowly cause decreased efficiency of the substrate.

If the solids content of the water is low, flow rates of the order of 50 to 150 gallons per minute per square foot (gpm/ft.$^2$) may be adequate to keep the reductor metal fairly clean. The actual rate required for clean operation is dependent on the geometry of the reactor and the particle size of the reductor metal. Excessive flow rates are to be avoided, as the substrate may become fluidized and the reductor metal may be lost, especially if it is in finely divided form.

Mercury removal efficiency from an aqueous solution containing dissolved mercury is chiefly governed or affected by reaction rates, contact times, and the previously mentioned blocking of reductor metal surfaces by solids collecting on them. The reaction rate for the reduction of mercuric ion to mercury metal in this process is determined mainly by the nature and state of subdivision of the reductor metal selected.

At high temperatures, the rate of the reduction reaction is increased but so is the rate of wasteful dissolution of the reductor metal into the solution.

Flow rates and transference rates can be ascertained by calculation or by routine observation to cover the operating concentration ranges required in any specific instance. The direction of movement of the stream may be horizontal or vertical or inclined. A substantially vertical movement is preferred since it assists in the control of the amalgam formation.

The contact time referred to here is calculated from the geometry of the substrate, the reactor vessel or column, the amount of void space estimated in the bed (where employed), and the flow rate of solution over the substrate. Good mercury removal efficiency is obtained with short contact times under conditions giving a high reaction rate. Contact times for the liberation of a minimum of 90 percent of dissolved mercury with iron metal may vary from as long as 180 minutes using unpacked pipes to about 2 minutes using a bed of steel turnings (scrap), to about 1/2 minute using a bed of 20 mesh iron filings (reagent grade).

Similarly, for a minimum of 90 percent mercury removal from a solution by zinc, contact times may vary from 8.5 minutes using a bed of commercial grade zinc shavings to 2.5 minutes for a bed of 20 mesh granular zinc (reagent grade) or from 4 to 6 minutes using zinc coated graphite. To maintain proper active reactor metal area, a factor in controlling contact time, the substrate must be recharged with reductor metal from time to time.

At practical flow rates and contact times, 90 percent or more of the dissolved mercury in an aqueous solution such as a spent mercury-chlorine cell brine is readily liberated. Thus, water originally containing about 10 ppm dissolved mercury and subjected to the process carries a residual dissolved mercury content of about 1 ppm. Over-all mercury recoveries of about 80 percent or better, as a substantially purified metal, are attainable.

The substrate may be coated with the amalgam forming metal in any of the known manners for such coating. It is preferable to spray metallize and advantageous to employ said process for spray metallizing the graphite substrate with a thin, firmly adherent film of the desired metal, such as copper, zinc or iron. In a conventional metal spraying process in which globules of molten metal are projected into a relatively cold substrate surface by a carrier gas, the metal globules solidify upon striking the cold surface of the substrate and are mechanically bonded thereto. It is, therefore, generally recognized that some means of heating either or both the coating and substrate must be employed in order to form a fusion bond therebetween. In some instances, it has been proposed to heat the substrate to an elevated temperature prior to, or simultaneously with, a coating operation, and in other instances the coating is heated after being deposited in the desired thickness on the substrate. When, however, the substrate is heated to an elevated temperature, it has been observed that an excessive amount of an inter-metallic compound is frequently formed, which results in an otherwise poorly adherent coating. When the coating metal is maintained at a relatively low temperature during the coating operation to avoid formation of inter-metallic compounds, there is often insufficient bonding between the metal coating and the substrate. It is not, however, an object of the instant invention to improve spray metallizing; but rather any spray metallizing technique may be used in accordance with particular requirements and the compounders' preference.

The preferably zinc coated graphite forms a composite structure in which the graphite serves as the base or support for the zinc coated thereon. Zinc coated graphite in this manner has a greater capacitry capacity removing mercury from water than does an equal weight of unsupported zinc. Another advantage of supported zinc is that it is much easier to handle than unsupported zinc, a further advantage is that due to spray metallizing not much zinc is needed and therefore costs are kept to a minimum and the efficiency of the zinc is increased, as is its effective surface area.

The supported zinc apparatus of this invention may have any desired ratio of zinc to graphite. Supported products containing about 6 percent to about 12 percent by weight of zinc, the balance graphite, have been found to be particularly desirable. However, substrates containing either greater or lesser amounts of zinc can also be used. A high surface area is, however, important for maximum effectiveness of supported zinc compositions. Substrates containing comparatively small amounts of zinc have been found more effective on the basis of the weight of zinc present than those containing large amounts of zinc. For example, a substrate containing about 7 percent zinc gives greater mercury removal per unit weight of zinc than does a substrate containing about 36 percent zinc. This appears to be due to the fact that the zinc in the former is in the form of a thin layer with a substantial portion exposed, while in the latter it is in a thick layer with proportionately less exposed surface.

The water effluent can be contacted with the zinc coated substrate either in a batch or continuous operation. A preferred mode of contact the water with zinc is to pass the water continuously upward through a bed or column of zinc supported on graphite. The effluent water will exit substantially free of mercury until the capacity of the zinc to form an amalgam with the mercury has been reached. The passage of water over the zinc may be stopped while the zinc is replenished, regenerated or replaced. The zinc-supported compositions of this invention can be regenerated and reused where desired. Regeneration of zinc is accomplished by known means; i.e., by passing a regenerating solution through a bed of zinc or by plating the zinc in a solution of said regenerant.

The instant hydrometallurgical process for removing mercury from water effluent has important advantages over other methods since the instant invention does not add any extraneous materials to the waste water and the zinc can be regenerated and reused if desired.

As is readily apparent, the mercury precipitated on the zinc is readily recovered therefrom by any one of several methods. Moreover, the present invention eliminates filtration and clarification solutions.

The mercury may thereafter be recovered from the zinc by heating the pregnant or mercury enriched zinc amalgam coated graphite in a retort, in the absence of oxygen, at a temperature sufficiently high to volatilize the mercury, which is then condensed to a liquid state. The zinc coated graphite is then suitable for reuse to adsorb more mercury from a similar sequence of operation.

Although zinc may be a relatively costly material, the fact that the zinc is spray metallized reduces the amount of zinc needed; the fact that graphite is used as substrate as opposed to activated carbon renders the instant process of recovering mercury economically attractive.

In a series of tests to demonstrate the removal of mercury from the aqueous effluent, of various mercuric and mercurous salts were prepared and each brought in contact with a zinc coated substrate.

The effluent was allowed to contact the coated substrate for varying times prior to taking samples of the feed and of effluent therefrom. Percent mercury removal from each batch tested was determined by analyzing the feed and effluent samples for mercurial content. The tests and results are shown below.

EXAMPLE I

Irregular shaped graphite particles ranging in overall lengths ½ – 1 ½ inches are spray metallized with zinc to build a coating 3–5 mils. The zinc is allowed to cover the graphite surface completely.

The zinc coated graphite is then placed in a column, thus building an activated bed for mercury removal. pH of the "as is" material is adjusted from pH 12.3 to 9.0. The 3.33 liters of material used above are then passed through a 4 inch × 8 inch glass tube containing zinc coated graphite.

| Pass | Sample No. | Exposure Time (min.) | Feed | Hg. Content, PPB eff. | Diff | c/o Red |
|---|---|---|---|---|---|---|
| 1st | 1 | 12' | 9,091 | 1,961 | 7,130 | 78.5 |
| 1st | 2 | 6.5 | 9,091 | 5,882 | 3,209 | 35.3 |
| 1st | 3 | 15.0 | 9,091 | 6,177 | 2,914 | 32.1 |
| 1st | 4 | 10.0 | 9,091 | 7,051 | 2,040 | 22.5 |
| 1st | 5 | 10.5 | 9,091 | 7,255 | 1,836 | 20.3 |
| 2nd | 6 | 18. | 9,091 | 3,977 | 2,690 | 40.5 |
| 2nd | 7 | 2 | 6,667 | 2,273 | 4,394 | 66.0 |
| 2nd | 8 | 2 | 6,667 | 2,614 | 4,053 | 61.0 |

EXAMPLE II

The method is the same as in Example I, but omiting the adjustment of pH. Mercury content of the Stream is 905 PPB instead of 9,091 as in Example I.

| Sample No. | Time (min.) | Hg. Content, PPB Feed | Eff. | Diff | c/o Red |
|---|---|---|---|---|---|
| 1 | 9 | 905 | 167 | 738 | 81.8 |
| 2 | 5 | 905 | 173 | 732 | 81.0 |
| 3 | 8.5 | 905 | 226 | 679 | 75.0 |

EXAMPLE III

The method is the same as in Example I, but the pH of "as is" material is adjusted from pH 12.3 to 3.0. Feed stock consisting of 6,173 PPB.

| Sample No. | Time (min.) | Hg. Content, PPB Feed | Eff. | Diff | Red |
|---|---|---|---|---|---|
| 1 | 6.5 | 6,173 | 265 | 5,908 | 96.0 |
| 2 | 4.5 | 6,173 | 481 | 5,692 | 92.0 |
| 3 | 7.0 | 6,173 | 432 | 5,741 | 93.0 |
| 4 | 5.5 | 6,173 | 327 | 5,846 | 95.0 |

We claim:

1. A process for the removal of mercury from mercury-bearing waters comprising contacting said waters, at a pH of from about 2 to about 11, with a solid, water-stable, metallic reducing agent having a greater solution potential than mercury, said metallic reducing agent being coated on an inert substrate and being capable of forming an amalgam with the mercury contained in said mercury-bearing waters, the mercury removed from said waters upon contact with said metallic reducing agent amalgamating and/or coalescing on the surfaces of the reducing agent, whereby a substantial proportion of the mercury content can be removed from the waters being treated.

2. The process of claim 1 in which said pH is from about 3 to about 7.5.

3. The process of claim 1 in which said reducing agent is taken from the group consisting of iron, zinc, bismuth, tin, nickel, magnesium, manganese, copper and mixtures thereof.

4. The process of claim 1 in which said reducing metal comprises iron.

5. The process of claim 4 in which said pH is from about 6 to about 7.5.

6. The process of claim 1 in which said reducing metal comprises zinc.

7. The process of claim 6 in which said pH is from about 9 to about 11.

8. The process of claim 1 in which said reducing agent comprises copper.

9. The process of claim 3 in which said inert substrate comprises particulate matter having an average diameter of from about ½ inch to about 1 ½ inches.

10. The process of claim 1 in which said metallic reducing agent is coated on said inert substrate at a thickness of from about 3 to about 5 mls.

11. The process of claim 1 in which the temperature of the mercury-bearing waters brought into contact with the metallic reducing agent is from about 0°C to about 70°C.

12. The process of claim 11 in which said temperature is from about 15°C to about 30°C.

13. The process of claim 12 in which said temperature is from about 15°C to about 20°C.

14. The process of claim 3 in which the temperature of the mercury-bearing waters brought into contact with the metallic reducing agent is from about 0°C to about 70°C.

15. The process of claim 14 in which said temperature is from about 15°C to about 30°C.

* * * * *